United States Patent Office 3,188,387
Patented June 8, 1965

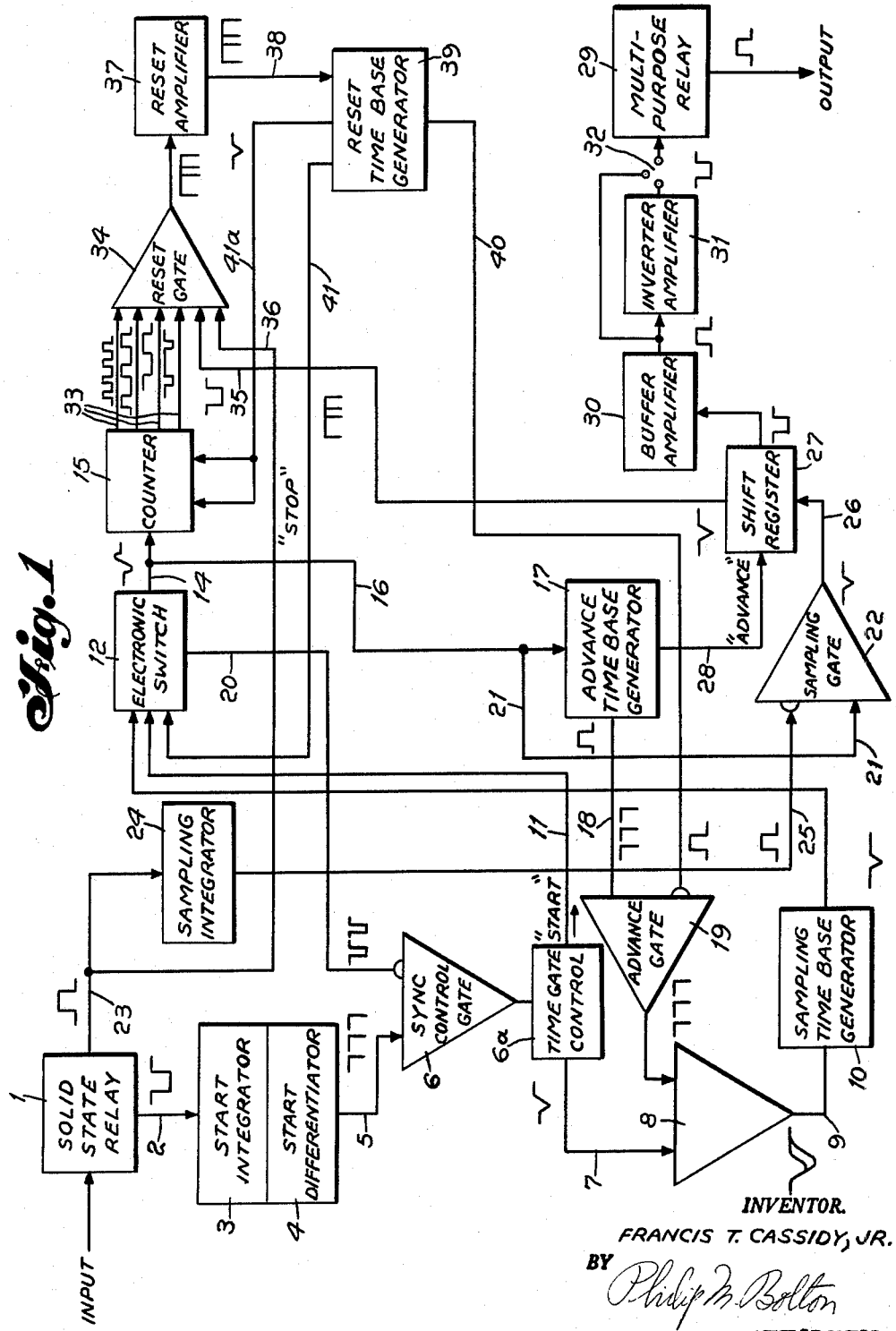

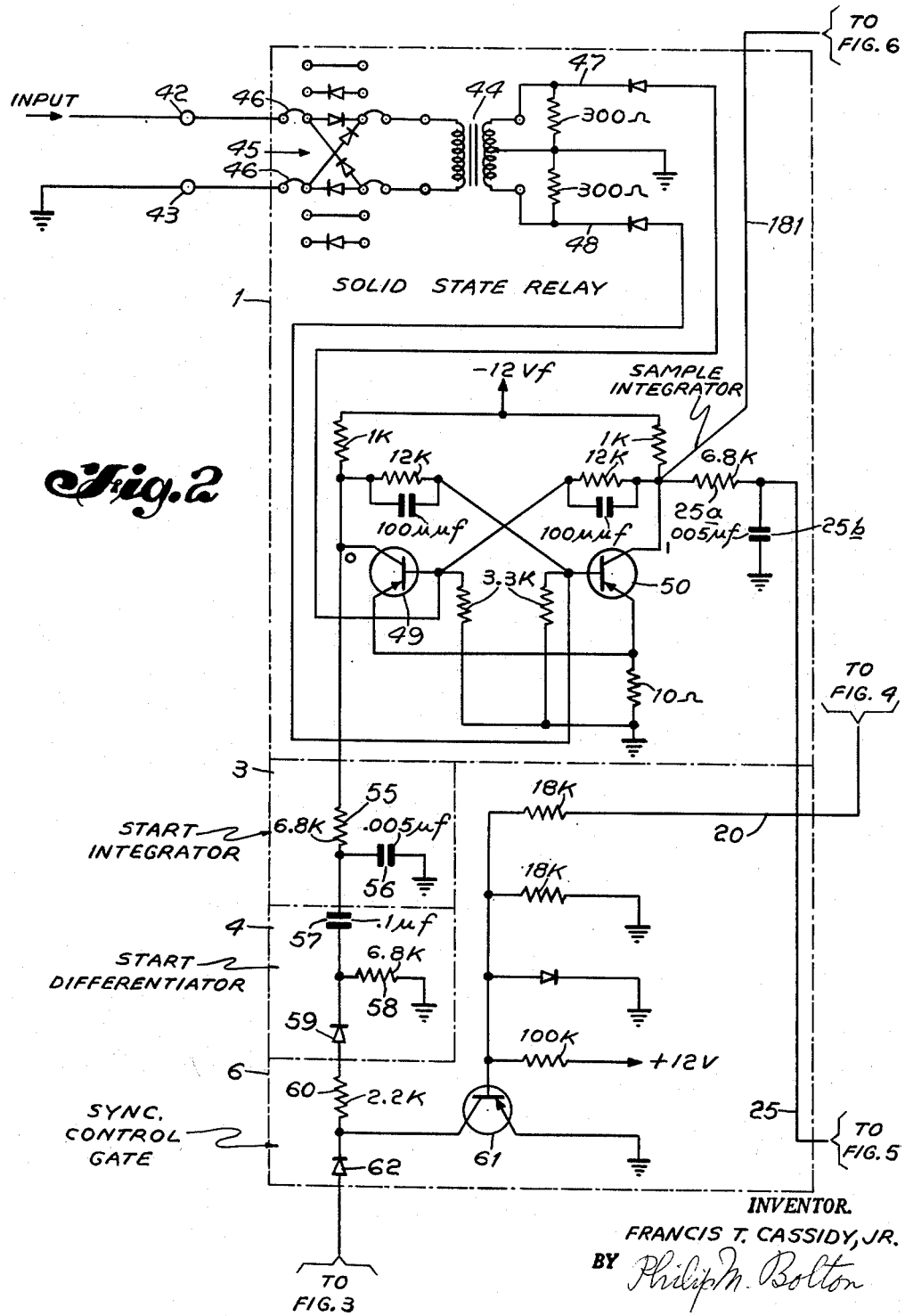

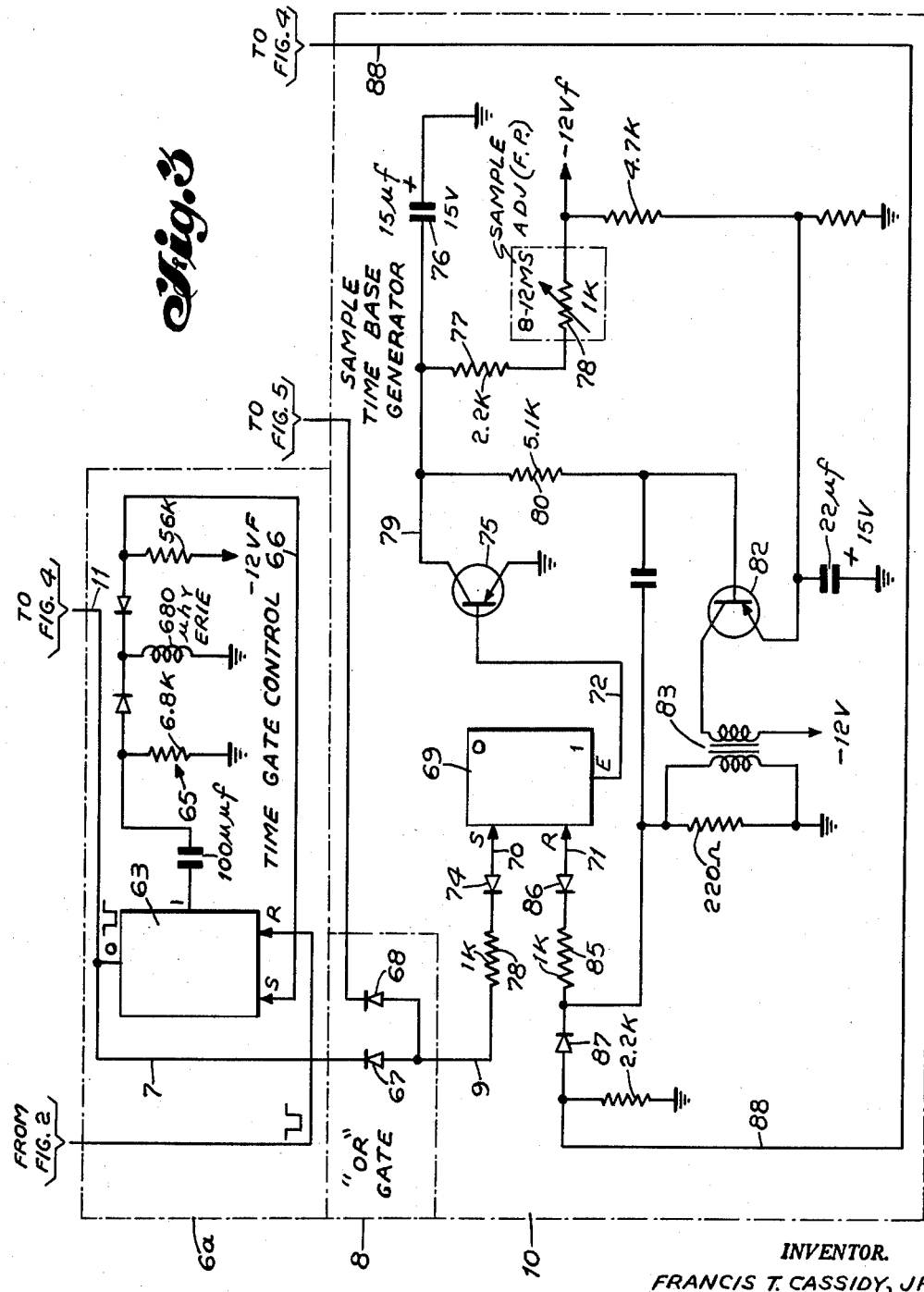

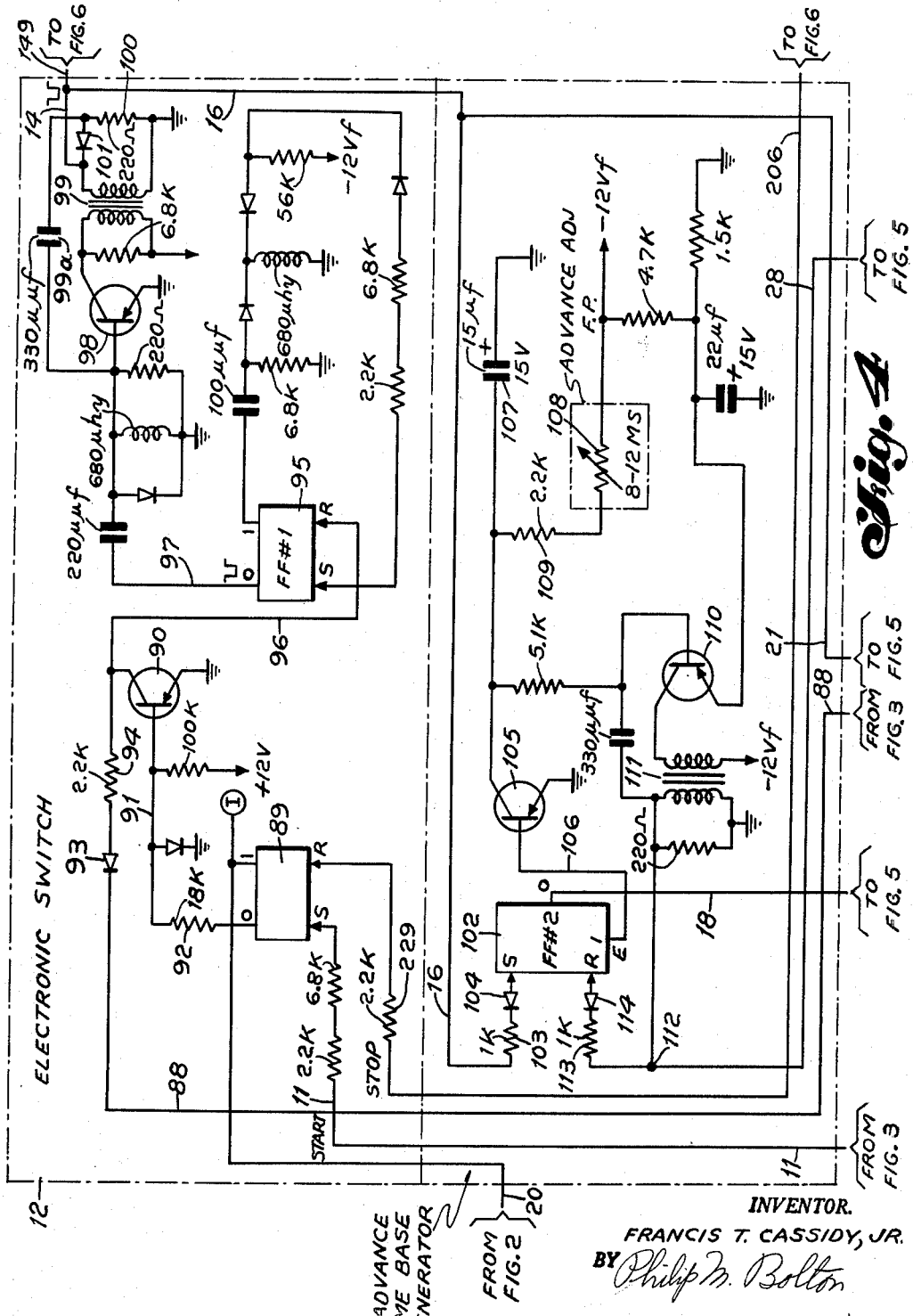

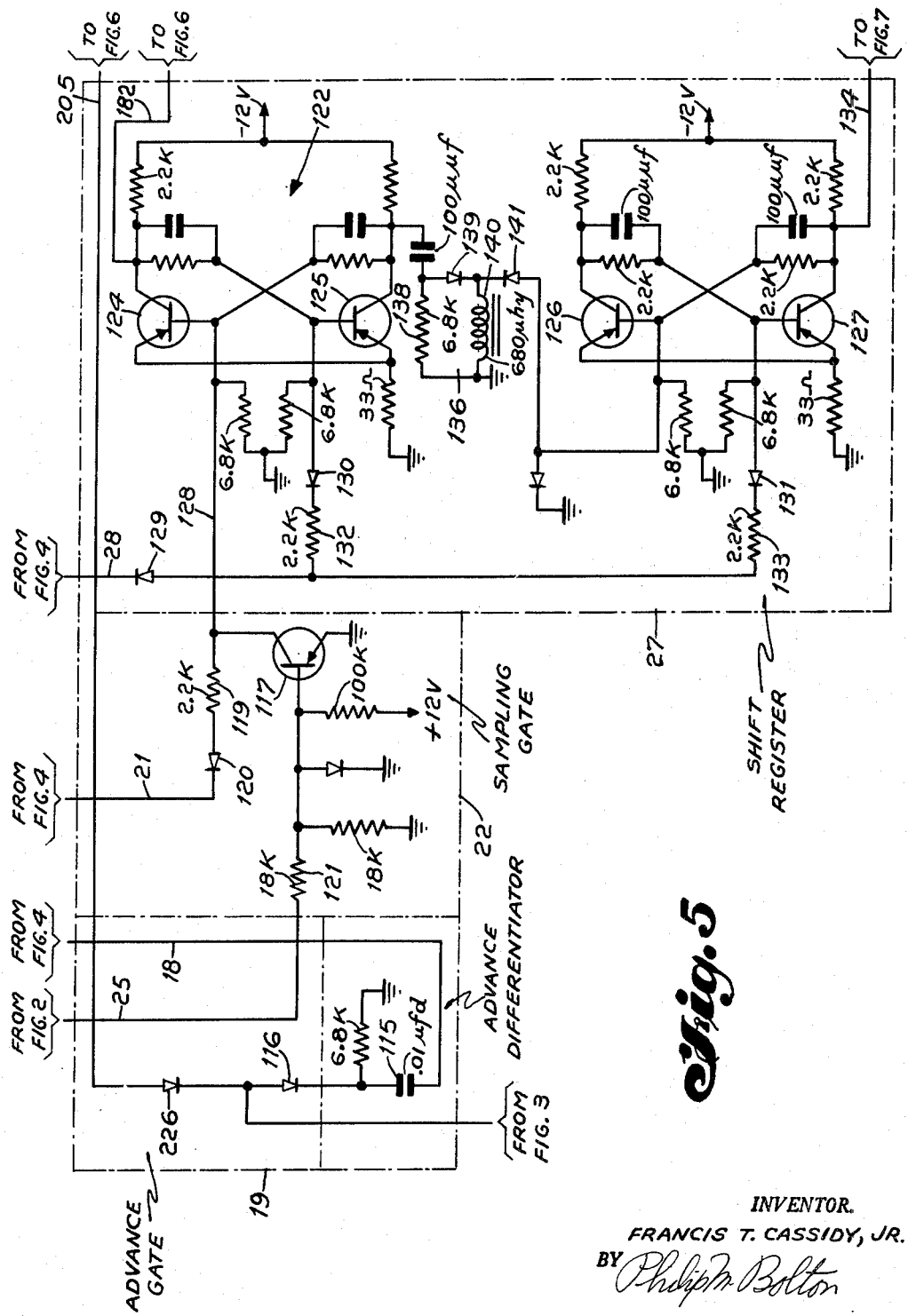

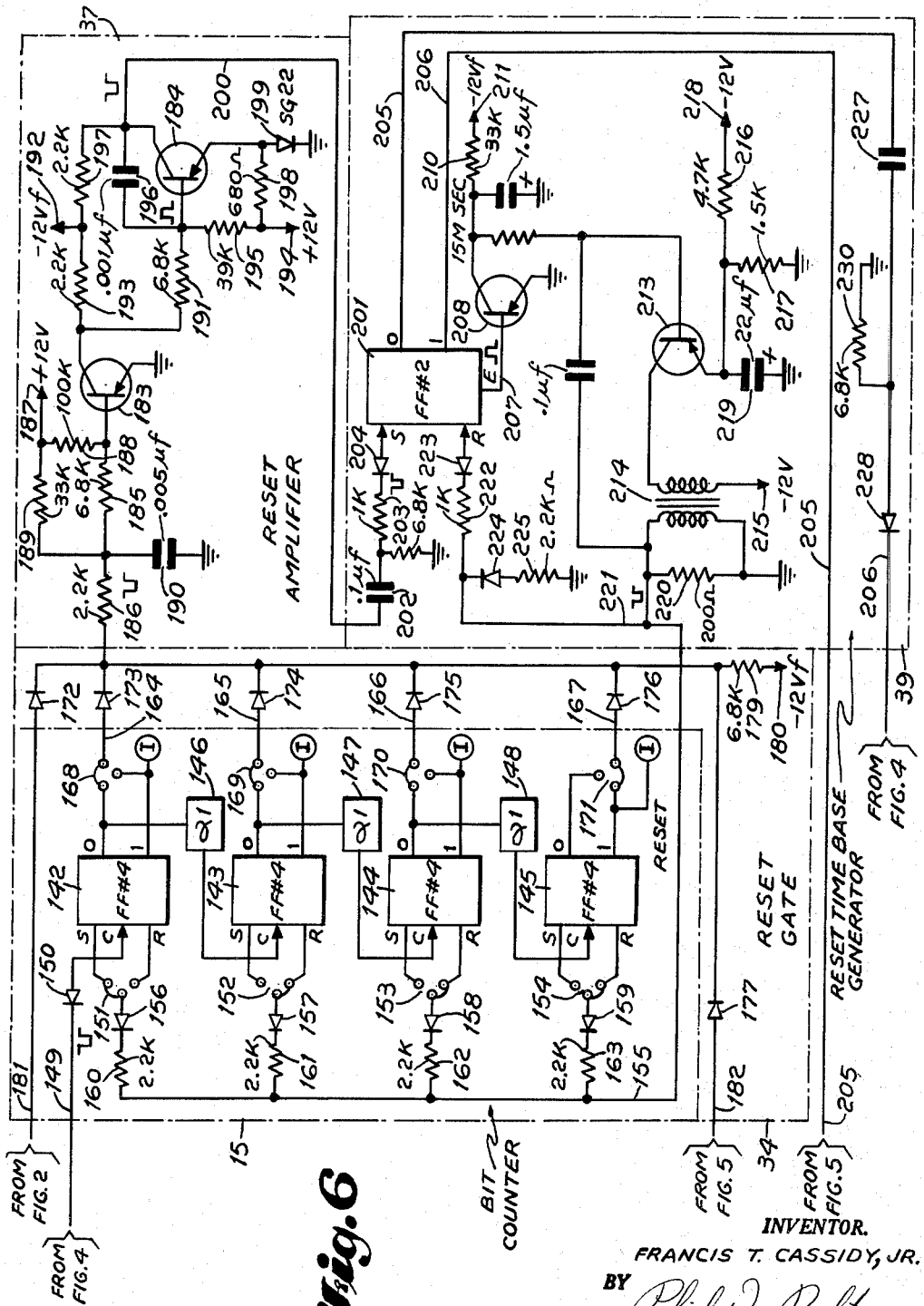

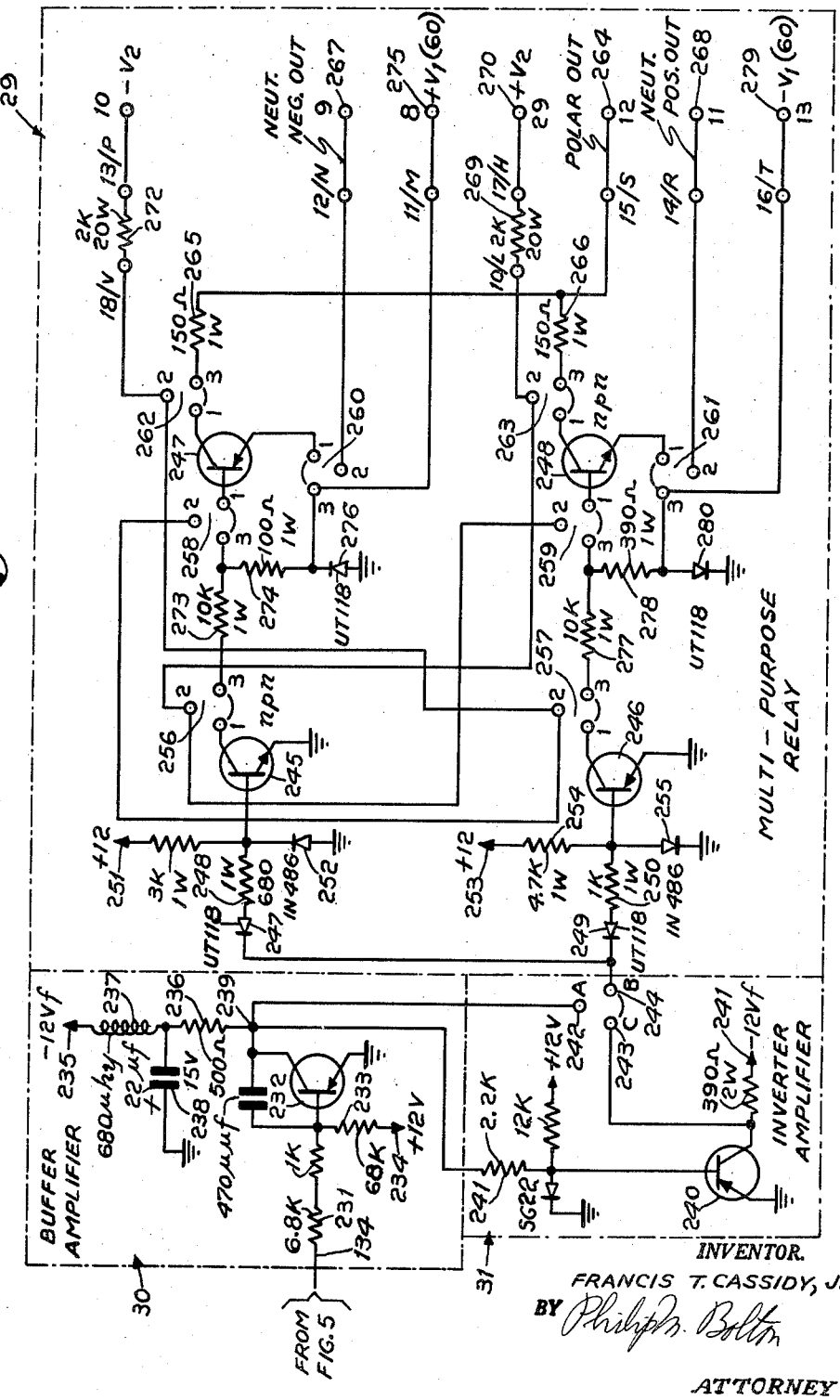

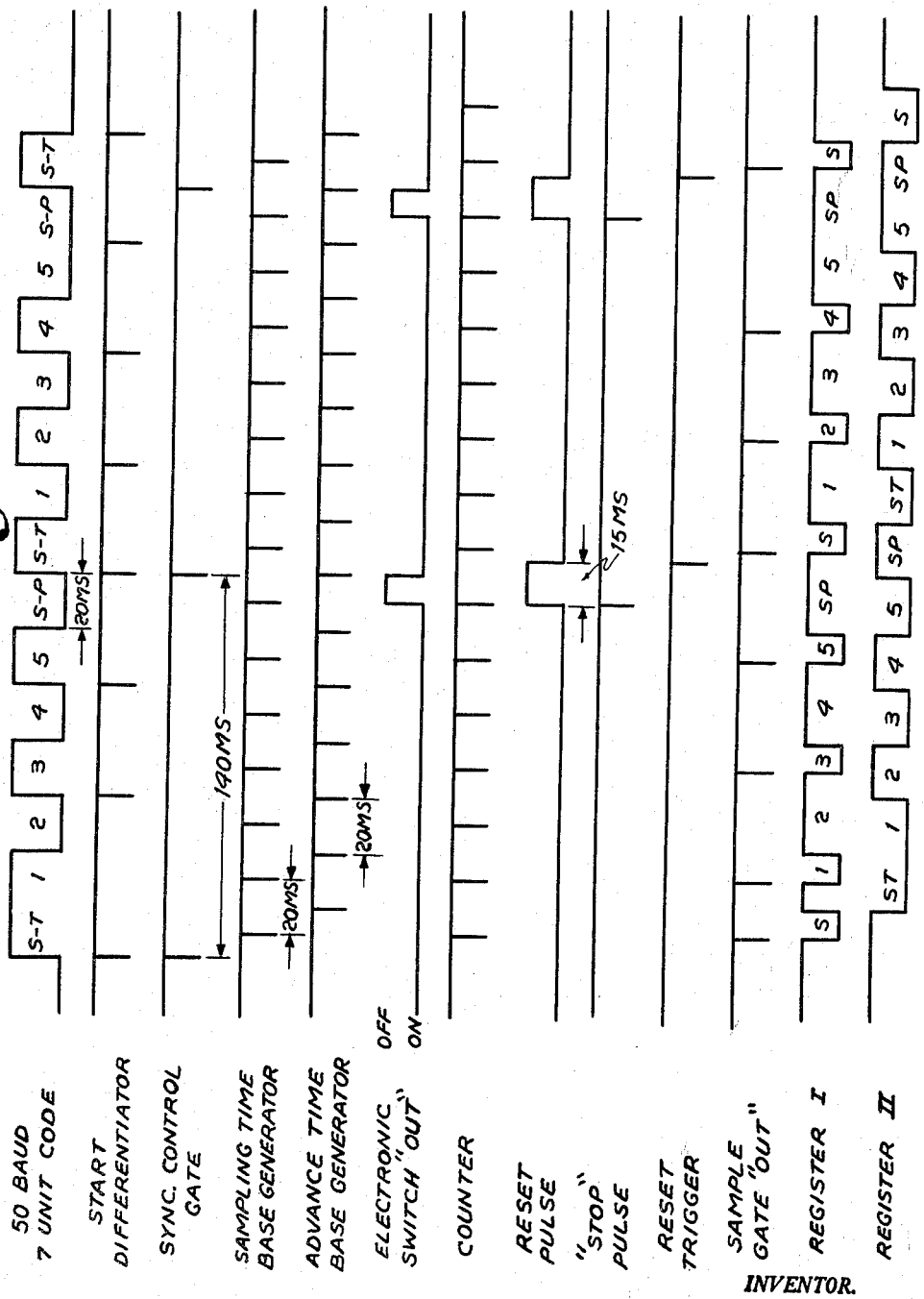

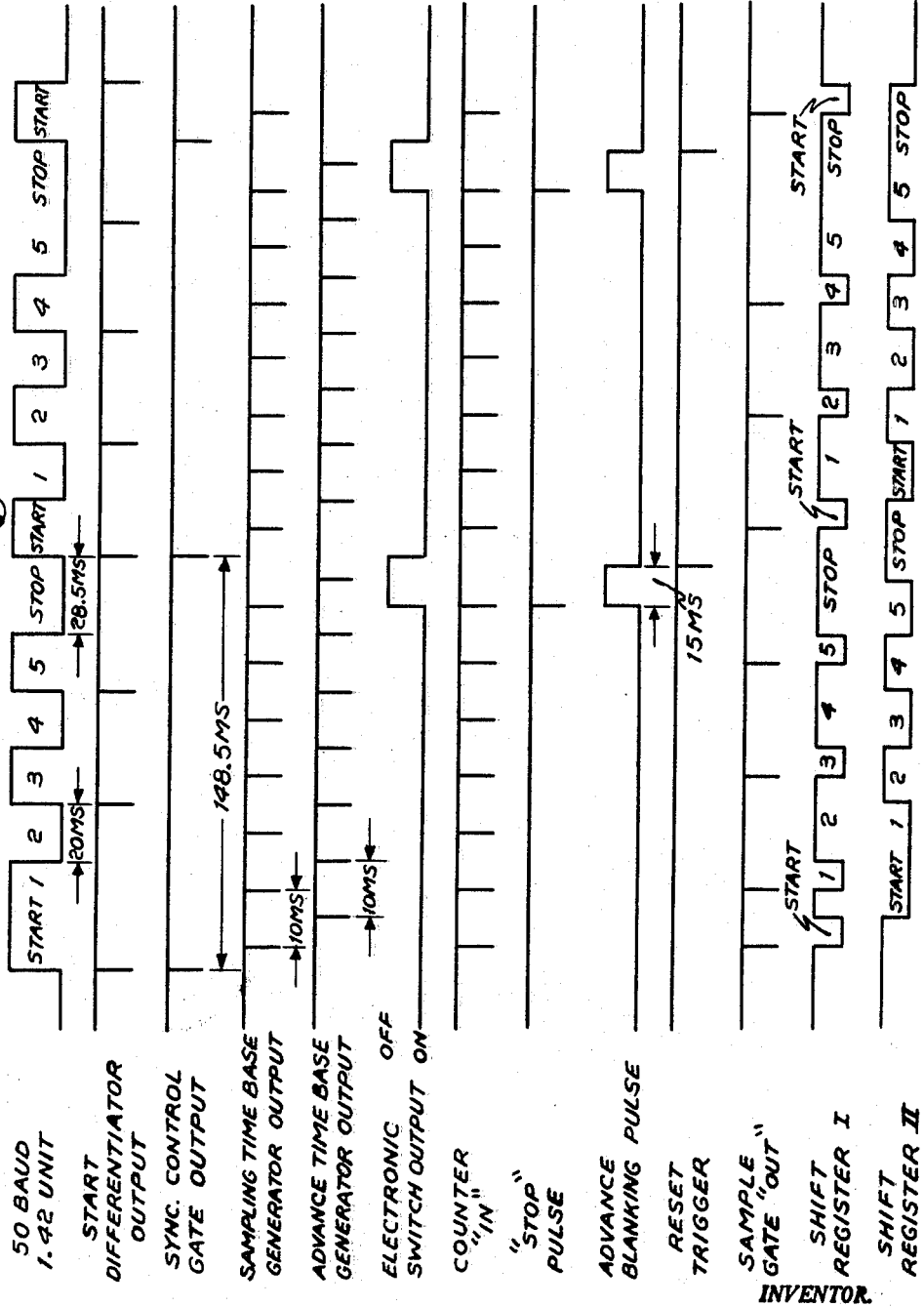

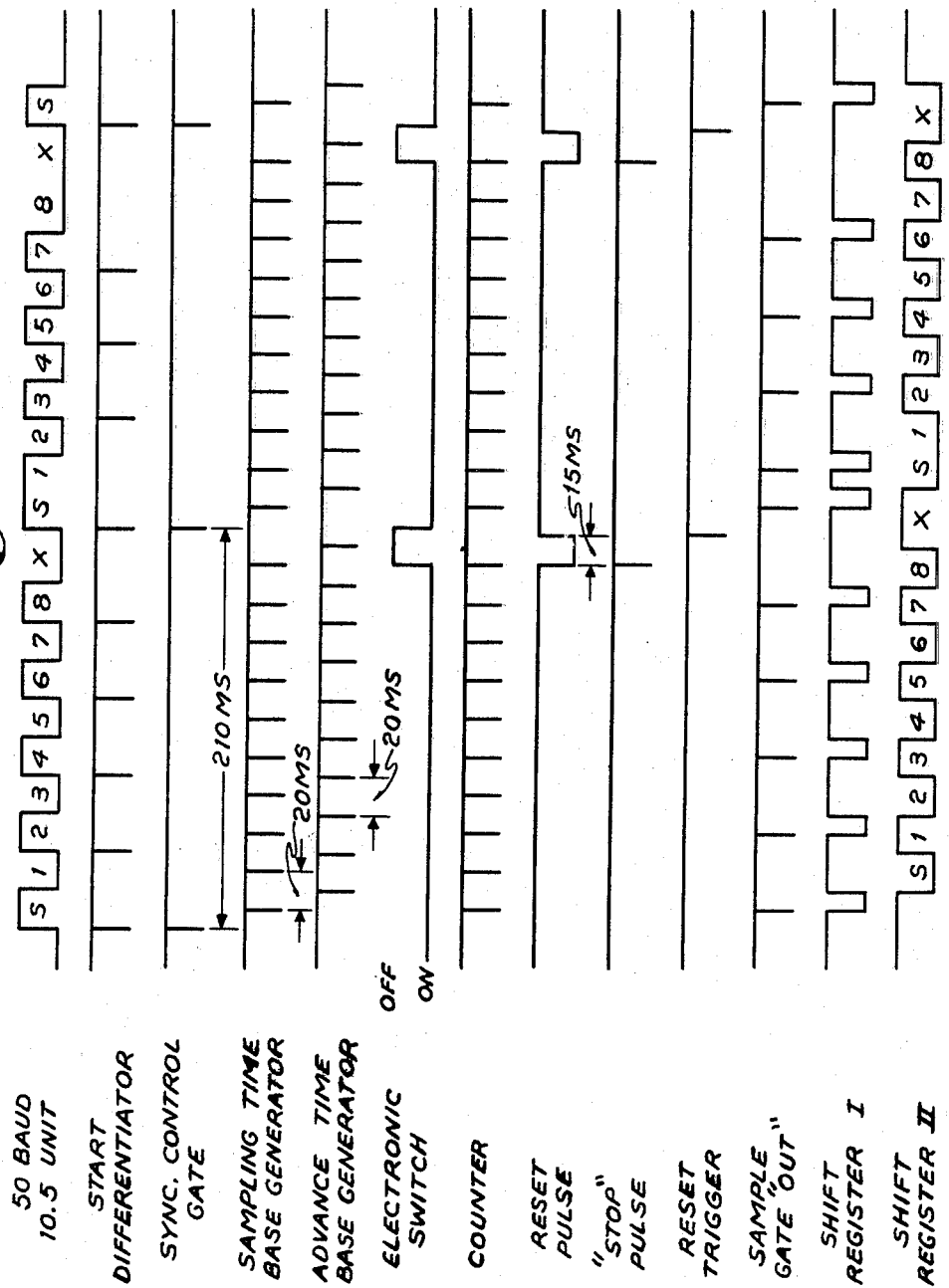

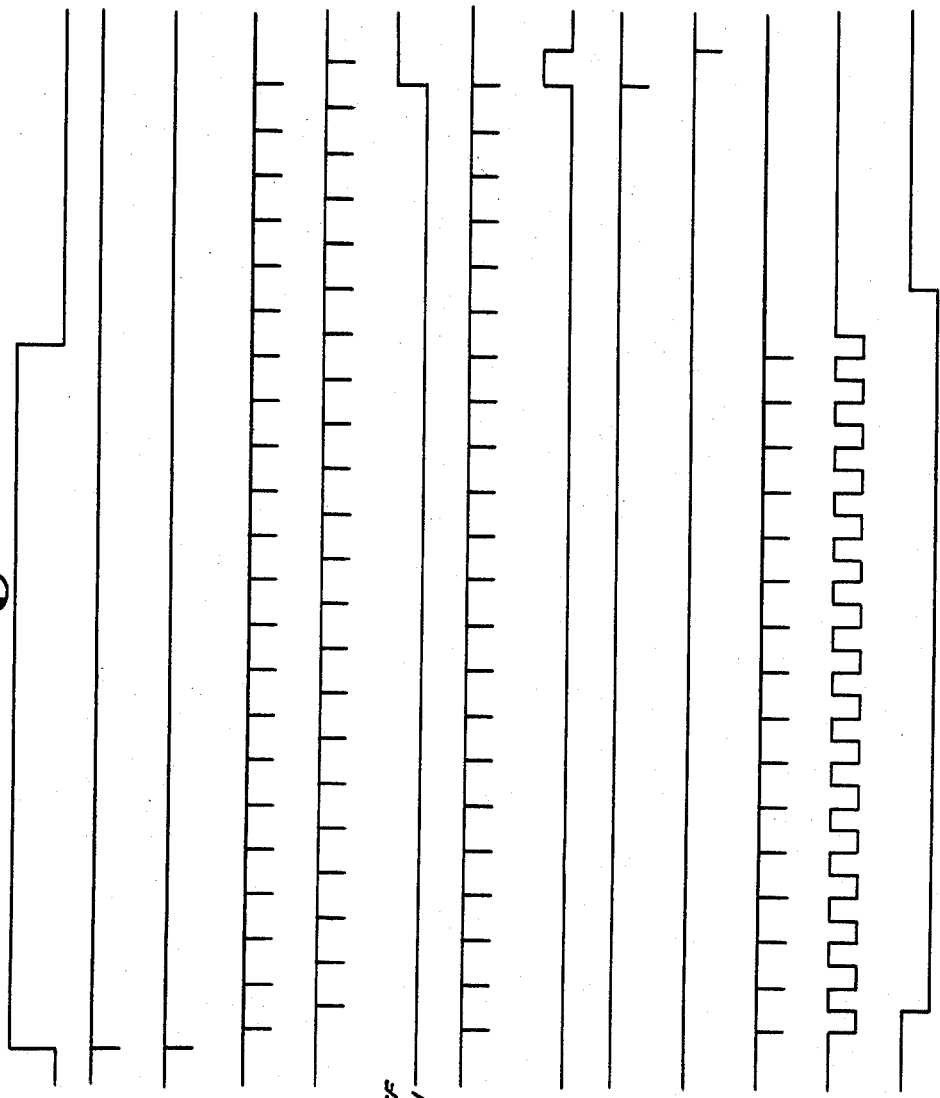

3,188,387
START-STOP REGENERATOR
Francis T. Cassidy, Jr., Brooklyn, N.Y., assignor to International Telephone and Telegraph Corporation, Nutley, N.J., a corporation of Maryland
Filed Apr. 12, 1962, Ser. No. 187,082
18 Claims. (Cl. 178—70)

This invention relates to start-stop regenerators used for correcting distorted signals and is especially designed for use in telegraph teleprinter systems and the like.

In a telegraph system where signals are received over long distances or where the signals pass through different types of apparatus, three forms of distortion may occur. These are: (1) bias distortion; (2) characteristic distortion; (3) fortuitous distortion. Probably the distortion causing the most difficulty in the receiving apparatus is the bias distortion, and the present invention is intended for dealing principally with this form. Bias distortion is the uniform lengthening or shortening of the space pulse at the expense of the mark pulse.

One of the objects of the invention is to provide a regenerator capable of restoring signals in any start-stop type of operational code.

Another object of the invention is to provide a regenerator which requires no alteration when switching from a code having a whole number of elements to one having that number of elements plus a fraction of an element. For example, in switching from a 7 element code to a 7.42 or 7.5 element code.

Another object of the invention is to provide a regenerator which is capable of operating from speeds of 45 bauds or less to 1000 bauds or more.

Another object of the invention is to provide a completely electronic regenerator with no moving parts.

Still another object of the invention is to provide a regenerator which is able to correct for bias distortion of 45% or greater.

Another object of the invention is to provide a regenerator which is capable of selectively producing a polar output or a neutral output, each having a number of different values.

The above-mentioned and other features and objects of this invention and the manner of attaining them will become more apparent and the invention itself will be best understood by reference to the following description of an embodiment of the invention taken in conjunction with the accompanying drawings, in which:

FIG. 1 is a schematic block diagram of the various components of the circuit;

FIG. 2 is a portion of the circuit diagram of the regenerator showing the solid state relay input circuit, the start integrator, the start differentiator, and the synchronizing control gate;

FIG. 3 is a diagram of another portion of the circuit showing the OR gate and the sample time base generator;

FIG. 4 is another portion of the circuit of the regenerator showing the electronic switch and the advance time generator;

FIG. 5 is another portion of the circuit diagram showing the advance gate, the sampling gate, the shift register, and the test clock;

FIG. 6 is another portion of the circuit diagram showing the reset gate, the reset amplifier and the reset time base generator;

FIG. 7 is another portion of the circuit of the regenerator showing the buffer amplifier, the inverter amplifier, and the multipurpose output relay;

FIGS. 8, 9, 10, and 11 are diagrams of waveforms which are found in various parts of the circuit under different code and speed conditions and which are helpful in understanding the operation of the circuit.

In brief the objects of the invention are accomplished by receiving and distorted signal, sampling a portion of each element and using this sample to reproduce a nondistorted output, the whole operation being kept in a complete systematic order by using a clock which will allow all the signals to be serially shifted out.

Referring now to FIG. 1 of the drawings which shows the schematic block diagram of the circuit, the incoming signals are received by a receiving means 1 comprising a solid state relay which steps down the input from 120 volts, 60 milliamperes, to a voltage-current relationship which is usable with the transistorized circuit. The relay 1 is a flip-flop circuit adapted to assume one condition for a "mark" element and to assume the other condition for a "space" element. This receiving circuit receives the ordinary telegraph code signals comprising a "start" element, followed by a plurality of elements carrying the intelligence, and ending with a "stop" element. The "start" element operates the relay 1 which delivers a negative potential over the lead 2 to the start integrator 3 which irons out ripples and other irregularities and delivers the potential to the start differentiator 4. The latter produces a sharp negative pulse which is applied to to the synchronizing control gate 6 over the lead 5. This gate is an inhibitor gate and is blocked after this first pulse in a manner to be later described.

The synchronizing control gate 6 delivers a pulse to a time gate control 6a, which is a monostable flip-flop, and thence over a lead 7 to an OR gate 8 from which the pulse is delivered to the sampling base generator 10 over the lead 9. This pulse initiates the operation of the sampling time base generator which produces a sharp negative sampling pulse a predetermined time after its operation is initiated, which pulse is thereafter used to maintain the operation of the sampling pulse generator, so that a sequence of these sampling pulses is produced corresponding to the sequence of pulses in the code.

The synchronizing control gate 6 also sends the sharp pulse originated by the "start" element over a lead 11 to an electronic switch 12 to turn the switch on and therefore permit sampling pulses which thereafter emanate from the sampling time base generator 10 to pass over lead 13, through the switch 12, and over a lead 14 to a counter 15.

These sampling pulse from the switch 12 also pass over a lead 16 to the advance time base generator 17 where, after a certain time delay, a negative potential is produced and sent over lead 18 to an advance gate 19 which is a normally open inhibitor gate, but is subsequently blocked in a manner to be later described. From the advance gate 19, the potential is delivered to the OR gate 8 to be applied to operate the sampling time base generator 10 again.

Recapitualting the above sequence of events, the first element of the code which is received causes a negative pulse to pass through the synchronizing control gate 6 and the OR gate 8 to initiate the operation of the sampling time base generator 10 which produces a negative pulse a predetermined time after the receipt of the initiating pulse. At the same time the negative pulse from the synchronizing control gate 6 opens the electronic switch 12 which permits the subsequently produced sampling pulse from the sampling time base generator 10 to pass through it and initiate the operation of the advance base generator 17 which then produces a negative potential which is applied through the advance gate 19 and the OR gate 8 to operate the sampling time base generator 10 again.

When the electronic switch 12 is turned on, a potential is delivered over the lead 20 to the synchronizing control gate 6 which inhibits the operation of that gate, so that no more pulses originating from the elements of that particular character can pass through that gate. Therefore the only way the sampling time base generator can be reoperated is by means of the negative potential coming from the advance time base generator 17 through the advance gate 19. With this arrangement, the sampling time base generator, after it has once been started by the first "start" element received at the input circuit will keep producing sampling pulses at the displaced time position until it is stopped in a manner to be described.

Each time a sampling pulse is produced by the sampling time base generator, it is delivered, after passing through the electronic switch 12, over a lead 21 to a sampling gate 22. This sampling gate 22 is an inhibitor gate and will pass only pulses coinciding with "space" elements which have been received by the receiving means 1. In order to produce the inhibiting effect, a negative potential from the solid state relay 1, originating from a "mark" element, passes over lead 23 and through a sampling integrator 24 and over lead 25 to the sampling gate 22 where it inhibits the passage of pulses through the gate.

The negative pulses corresponding to "space" elements from the sampling gate 22 pass over lead 26 to set the first stage of the shift register 27 which is caused to step after each pulse is received by means of a delayed pulse sent from the advance time base generator 17 over lead 28.

The output of the shift register is the regenerated input signal but, if desired, is delivered to a multi-purpose relay 29 in order to produce the output in any desired manner, as, for example, neutral positive, neutral negative, or polar. For this purpose a buffer amplifier 30 is arranged between the shift register 27 and the multi-purpose relay 29 and an inverter amplifier 31 may be selectively connected after the buffer amplifier 30 by means of a strapping connection, indicated at 32.

When all the elements of a character have been received, it is necessary to stop the sampling time base generator 10. This is accomplished by means of the binary counter 15 which counts the number of elements in the character, and when the count is complete, delivers a plurality of outputs over leads 33 to a reset gate 34 which is an AND gate. The leads 33, which are energized when the proper number of elements have been counted, are input circuits to this AND gate. Two other inputs to this reset gate are provided. One is indicated at 35 and is energized when the first element shift register is in a condition representing "space." The other input to the AND circuit 34 is indicated by the lead 36 and is connected to the output 23 of the solid state relay 1, which output is energized when the solid state relay is in a condition caused by the receipt of a "space."

When all of these conditions are correct, the reset gate 34 will produce a signal which is amplified by the reset amplifier 37 and the amplified signal delivered over a lead 38 to a reset time base generator 39 which is thus caused to produce three signals. The first of these signals, which is a positive potential, is produced as soon as the operating signal is received and passes over lead 40 to the advance gate 19 where it prevents the passage of signals through that gate from the advance time base generator 17 which are used to start the sampling time base generator. Since the synchronizing control gate 6 is blocked, the generator 17 is shut off. The second signal from the reset time base generator 39 is a negative potential and passes over lead 41 to the electronic switch 12 to shut off the switch, so as to prevent any further passage of pulses through it. The third signal produced by the reset time base generator 39 is a delayed negative pulse which passes over lead 41a to the counter where it resets the stages of the counter to a normal setting preparatory to a further operation of this counter for the next character.

A detailed description of the various circuit components will now be given with reference to FIGS. 2 to 10.

Various methods are used to differentiate "mark" and "space" elements of a telegraph code. In polar signalling, current flows in one direction in the wire for a "mark" element and in the other direction for a "space" element. In neutral signalling, current may flow in the wire to represent one element and no current to represent the other element, and the current may flow in either direction.

It is a feature of the regenerator of the invention to be able to receive any type of telegraph signalling with a minimum of alteration of the input circuit. Accordingly the input circuit or solid state relay 1 is provided with a plurality of terminals adjacent the input leads which may be strapped in a predetermined manner for use of the regenerator with a particular type of telegraph signal. Thus two input terminals 42 and 43 are connected to the primary of a transformer 44 through a network 45 of rectifiers which can be interconnected in different ways by means of the strapping terminals indicated at 46. The strapping shown in the drawings has been made to accommodate telegraph signals on the neutral basis with current in either direction representing a "mark" element and no current representing a "space." By means of the cross-connected rectifiers of the network 45, current in either direction received over the terminal 42 with the terminal 43 connected to ground will pass in one direction through the primary coil of the transformer 44 whose secondary has its midpoint connected to ground. This causes current to flow through the secondary of the transformer so as to produce a negative potential on the lead 47. At the end of the pulse the current will reverse in the secondary and produce a negative pulse on the lead 48.

These two leads, 47 and 48, are connected respectively through suitable decoupling rectifiers to the bases of two transistors 49 and 50 which are connected together in a known manner to form a bistable flip-flop circuit. The transistors are p-n-p transistors and the circuit arrangement is such that a negative potential applied to the base will cause the transistor to conduct. Normally therefore the transistor 49 is conducting, since current will be flowing in the input prior to the transmission of a character which will produce a negative pulse on the lead 47.

When a "start" element occurs at the beginning of a character, current stops, producing a "space" signal and a negative potential will be applied to the lead 48 to cause the transistor 50 to conduct and the transistor 49 to be shut off. In effect, therefore, the input circuit 1 acts as a translator receiving any form of transmission and turning transistor 49 on for a "mark" and 50 on for a "space."

When the transistor 49 is shut off, the collector thereof becomes more negative and a negative potential is thus delivered to the start integrator 3, which includes the resistor 55 and the grounded capacitor 56, and delivers a pulse to the start differentiator circuit 4, which includes the capacitor 57 and the resistor 58 connecting the end of the capacitor to ground.

The start integrator 3 eliminates any small splits or ripples in the signal. The start differentiator circuit differentiates the pulse to produce a very sharp negative pulse which passes through a decoupling rectifier 59 and a resistor 60 to the synchronizing control gate 6.

This synchronizing control gate 6 comprises a p-n-p transistor 61 and the resistor 60 is connected to the collector of this transistor. The emitter of the transistor 61 is connected to ground, while its base is provided with a suitable biasing circuit and is connected over the lead 20 to the electronic switch 12.

The signal from the collector of the synchronizing control gate 6 is connected through a decoupling diode 62 to one input R of a flip-flop circuit 63 which comprises the time gate control 6a of FIG. 1. The function of the time gate control is to produce the "start" potential over the lead 11 to turn on the elecrontic switch 12 in a manner to be described, so that pulses from the time base generator 10 can pass through it, and also to provide a potential over lead 7 to pass through the OR gate 8 to initiate the operation of the sampling time base generator 10.

The flip-flop circuit 63 is shifted to one of its conditions by the sharp negative pulse from the synchronizing control gate and in that condition produces a negative potential from its "0" output over the lead 11. At the same time a positive potential is delivered from its "1" output to a delay network 65 which is fed back to the S input of the flip-flop 63 over lead 66 to shift the flip-flop back to its normal condition after a predetermined time which is sufficient to permit the desired operation of the circuit. The "0" output of the flip-flop 63 which its negative potential is also passed over lead 7 to the OR gate 8 comprising two diodes 67 and 68 which are polarized so that negative pulses may pass through them and over the lead 9 to the sampling time base generator 10.

Sample time base generator 10 comprises a flip-flop circuit 69 having two inputs 70 and 71 and an output 72. The input 70 is connected to the lead 9 through a resistor 73 and a decoupling diode 74, and when a negative pulse is delivered to this input, the flip flop circuit will shift to a condition which will produce a positive pulse on the output 72. This output is connected to the base of p-n-p transistor 75 whose emitter is connected to ground. The collector of the transistor 75 is connected to a delay circuit comprising the capacitor 76 and the resistors 77 and 78, the latter being adjustable. These two resistors are connected in series with the capacitor between ground and a negative potential of 12 volts. The juncture of the resistor 77 and capacitor 76 is connected to the collector of the transistor 75 over lead 79.

When the transistor is conducting, both sides of the capacitor 76 are at ground potential and the capacitor is not charged. When a positive potential is applied to the base of the transistor 75, the transistor is rendered non-conducting and the capacitor 76 begins to charge. This causes the juncture of the resistor 77 and capacitor 76 to increase negatively, and this point is connected through a resistor 80 by means of a lead 81 to the base of a transistor 82 whose collector is connected to a potential of minus 12 volts through a primary of a transformer 83. The emitter of the transistor 82 is suitably biased, so that when negative potential on the lead 81 increases to a predetermined amount, the transistor 82 will conduct and current initiated in the primary of the transformer 83 over the collector-emitter circuit will induce a voltage in the secondary. The secondary is wound in such a way that a negative pulse from the induced voltage will be applied to a point 84 which is connected to the input 71 of the flip-flop 69 through a resistor 85 and a decoupling diode 86. This will shift the flip-flop 69 to its other condition. At the same time, the negative potential from the point 84 is transmitted through a decoupling diode 87 over a lead 88 to the electronic switch 12.

The effect of this arrangement is to produce a negative pulse on the lead 88 a short time after the flip-flop 69 has been shifted by a negative pulse from the OR gate 8. This time is adjusted by means of the resistor 78 of the delay circuit and is made to occur at a time corresponding to exactly half of the baud. In other words at the beginning of the "start" pulse, the flip-flop shifts, and at a time exactly one-half the time of the baud a negative pulse is produced on the lead 88 to be delivered to the electronic switch.

The electronic switch 12 comprises a bistable flip-flop 89 which is in one condition when the electronic switch is closed and in the other condition when the electronic switch is open. The negative pulse on the start lead 11 from the time gate control 6a is delivered to the input S and shifts the flip-flop 89 to the condition in which the electronic switch is open. Thereafter, when a negative pulse on the lead 88 from the sample time base generator 10 arrives at the electronic switch, it can pass through the switch. To this end a transistor 90 has its base connected over a lead 91, provided with suitable bias circuit network for the transistor and over a resistor 92 to the "0" output of the flip-flop 89. This output produces a positive potential when the flip-flop is shifted by the pulse over the start lead 11. The transistor 90 has its emitter connected to ground and its collector circuit connected to the lead 88 from the sample time base generator 10 through a decoupling diod 93 and a resistor 94. The collector of the transistor 90 is also connected to one input of another flip-flop 95 over a lead 96.

Normally the base of the transistor 90 is biased so that a negative pulse received on the collector over the lead 88 will turn the transistor on and thereby short the negative pulse to ground over the collector-emitter circuit. When, however, the flip-flop circuit 89 has been shifted by the negative pulse on the start lead 11, the base of the transistor 90 is biased so that a negative pulse on its collector cannot turn it on, and such pulse is therefore delivered to the R input of the flip-flop 95 to shift it to the condition where a negative potential appears on the "0" output. This potential is delivered over a lead 97 to the base of an amplifying transistor 98 of the p-n-p type through a suitable filter circuit. This renders the transistor 98 conductive, so that a circuit is established from ground, to which the emitter is connected, to a potential of minus 12 volts through the primary of a transformer 99. The secondary of this transformer is connected across a resistor 100 and a diode 101 in series, so as to produce a negative pulse on the output lead 14 which is connected to the end of the secondary.

The juncture of the diode 101 and the resistor 100 is connected through a capacitor 99a to the base of the transistor 98. This provides a feedback which ensures the saturation of the transistor, so that a strong negative pulse appears on the lead 14.

Thus, for each negative pulse appearing on the lead 88 from the sample time base generator 10, as long as the electronic switch 12 is open, a negative pulse will appear on the output lead 14. As has already been explained, the lead 14 goes to the counter 15 and also to the advance time base generator 17 over a lead 16.

The advance time base generator 17 comprises a flip-flop circuit 102 which is caused to shift in one direction by the pulse over the lead 16 and is provided with a delay circuit to cause it to shift back to its normal condition after a predetermined time which is equal to one-half of a baud. Thus, in this respect the circuit is the same as that of the sample time base generator 10.

The flip-flop 102 is caused to assume one condition then a negative pulse is received over the lead 16 which is connected to one of its input circuits S over a resistor 103 and a decoupling diode 104. The return of the flip-flop to its original condition is caused to take place in exactly the same manner as the flip-flop 69 of the sample time base generator 10. The circuit for causing this return comprises a transistor 105 whose base is connected by a lead 106 to the "1" output of flip-flop 102 which produces a positive pulse when the flip-flop is shifted by a negative pulse over the lead 16. The positive pulse on the base of the transistor 105 causes this transistor to be non-conductive, whereupon the discharge circuit of the capacitor 107 through the collector-emitter circuit of the transistor 105 is opened, and the capacitor begins to charge from the negative 12 volt source over the adjustable resistor 108 in series with the fixed resistor 109. When the juncture of resistor 109 and capacitor 107 becomes negative enough, the transistor 110 conducts, since its base has been made negative with respect to the emitter, and a current will flow through the emitter-collector circuit of this transistor and the primary of a transformer 111. The secondary of the transformer is connected between the ground and a point 112 which in turn is connected over a resistor 113 and a decoupling diode 114 to the other input of the flip-flop 102. Thus, after the predetermined selected time delay, the flip-flop 102 will return to its normal condition after having been shifted by the negative pulse applied to the lead 16.

When the flip-flop 102 returns to its normal condition, a negative pulse is delivered from the "0" output of the flip-flop over the lead 18 to the advance gate 19. This negative pulse passes through capacitor 115 and diode 116 to the diode 68 of the OR gate 8 through which it will pass to start the sample time base generator 10 again by shifting its flip-flop 69.

The negative pulse at the point 112 is also transmitted over a lead 28 to the shift register 27 to cause the register to shift in a manner to be described.

With the electronic switch 12 closed, a pulse produced on the lead 88 will pass through the electronic switch, creating a pulse on the output lead 14 which is delivered over lead 16 to shift the flip-flop 102 in the advance time base generator 17. This flip-flop 102 will shift back again after one-half baud time delay and at that time produce a pulse over the lead 18 which will start the sample time base generator 10 again by shifting its flip-flop circuit 69. Thus, the sample time base generator and advance time base generator, connected by the electronic switch, will continue to cycle, producing a series of negative pulses on the lead 88 which are spaced at exactly 1 baud apart but are staggered one half baud with respect to the incoming signals.

The purpose of the sample time base generator 10 and advance time base generator 17 is to sample the incoming signal somewhere near the middle of each baud where the voltage will be at its maximum. In order to accomplish this sampling, the sampling gate 22 is provided. This gate comprises a p-n-p transistor 117 whose emitter is grounded and whose collector is connected by means of lead 21, through a resistor 119 and a diode 120, to the lead 16 coming from the electronic switch. The base of the transistor 117 is normally biased, so that negative pulses passing over the lead 118 from the electronic switch will be shorted to ground. The base of the transistor 117 is also connected over a resistor 121, the lead 25, and an integrating circuit comprising resistor 25a and grounded capacitor 25b to the collector circuit of the transistor 50 in the solid state relay circuit 1.

When a "mark" is being received, the transistor 50 will be non-conducting and the collector thereof will have a negative potential thereon which will cause the transistor 117 in the sampling gate 22 to be conducting, and therefore any pulses coming from the electronic switch 12 over the lead 21 will be shorted to ground. However, when a "space" is being received by the solid state relay circuit 1, the transistor 50 therein is conducting, and a positive potential will be delivered over the lead 25 to the base of transistor 117 to render it non-conducting, so that a negative pulse from the electronic switch 12 may enter the shift register 27 over the leads 21 and 128.

The sampling gate 22 therefore has the function of permitting the sampling pulse to pass from the electronic switch 12 to the shift register 27 after a "space" has been received by the receiving circuit and of preventing a pulse from reaching the shift register after a "mark" has been received by the receiving circuit. The pulses delivered to the shift register will therefore correspond with the character elements received by the receiving means 1.

The shift register may be any well known type of shift register, and in the present instance a two stage shift register is sufficient. I have shown in FIG. 5 two stages, 122 and 123, each comprising a flip-flop circuit having two transistors connected so as to be bistable. Transistors 124 and 125 are provided in the first stage 122, while transistors 126 and 127 are provided in the second stage 123. The input pulse from the sampling gate is delivered over the lead 128 which is connected to the collector of the transistor 117 in the sampling gate. This lead is connected to the base of the transistor 124, and when a negative potential appears on this lead, transistor 124 is rendered conductive, while transistor 125 becomes non-conductive. The turning off of transistor 125 causes its collector to become negative.

The pulse from the advance time base generator over lead 28 is delivered to the bases of transistors 125 and 127 of the two stages over suitable decoupling diodes 129, 130, and 131 and associated resistors 132 and 133. The effect of this pulse, which comes one-half a baud after the pulse on lead 128, is to cause both transistor 125 and 127 to become conducting and transistors 124 and 126 to become non-conducting. In this instance transistor 127 was already conducting and hence no change is made at the output circuit 134 which leads to the buffer amplifier 30. But since the transistor 125 was non-conducting, the pulse from the advance time base generator over lead 28 causes this transistor to conduct, with the result that the potential of the collector shifts in the positive direction. This causes a positive pulse to pass over the lead 135 from the collector of transistor 125 to a delay circuit 136 comprising capacitor 137, resistor 138, diode 139 and choke 140, the diode and choke being connected in series with the capacitor, and the resistor being in shunt with the diode and choke. The choke becomes charged, and a short time thereafter a negative pulse is sent through the decoupling diode 141, connected to the juncture of the choke 140 and diode 139, to the base of transistor 126 in the second stage 123. This causes the transistor 126 to conduct and the transistor 127 to become non-conducting. Thus the output 134 of the second stage shifts from a positive potential to a negative potential. The shift register is then ready to receive the second information signal which comes from sampling gate 22 over lead 128.

If the signal, just previously received before the sampling pulse, is a "mark," no signal will appear on the lead 128, and the output on lead 134 will not be changed. If the signal previously received by the receiver is a "space," a negative pulse will appear on the lead 128 at the time of the sampling pulse, and the first stage will shift, as already described.

The operation of the shift register will therefore cause the signal on output lead 134 to correspond to the input signal to the receiving circuit, except that the output signal on lead 134 will be a short time later than the received signal and will be completely regenerated in waveform.

When a character has been completely received, it is necessary to shut off the sample time base generator 10, which would otherwise continue to cycle in cooperation with the advance time base generator 17. In order to accomplish this purpose, the counter 15 is provided. This counter 15 is a well known binary counter, and for the particular arrangement shown, which is adapted to receive a 7 unit code, is arranged to make a binary count of 7. It comprises 4 flip-flop circuits 142, 143, 144 and 145. Each of these flip-flops is provided with a center input C in addition to the two normal inputs S and R which may be used to shift it to either of the two conditions. The center input will shift the flip-flop to the condition opposite to that in which it is when the pulse is received on the center input. The "0" output of each flip-flop, except the last, is connected through a delay circuit (shown at 146, 147, and 148 for the respective flip-flops) to the center input C of the next succeeding flip-flop through suitable decoupling diodes. The output lead 14 from the electronic switch 12 is connected over an input lead 149 and decoupling diode 150 to the center input of the first flip-flop 142.

In order to set the flip-flops of the counter 15 so that they will be prepared to count the predetermined number, and in order to arrange for counting different numbers when different codes are used, terminal groups 151, 152, 153 and 154 are provided. These terminal groups are associated respectively with the flip-flops 142 to 145 and each have three terminals, two of which are connected to the two terminal S and R inputs of the associated flip flop circuit. The other terminal of each group is connected to a lead 155 which receives a reset pulse from the reset time base generator 39 in a manner to be described. These third terminals are respectively connected to the lead 155 through decoupling diodes 156, 157, 158 and 159, and series resistors 160, 161, 162 and 163.

The terminal groups are arranged so that the third terminal of each group may be strapped to one of the others. As shown the third terminal of group 151 is strapped to the upper terminal connected to the S input of the flip-flop 142, while the third terminals of groups 152, 153 and 154 are strapped respectively to the lower terminals of the groups connected to the R inputs of the flip-flops 143, 144 and 145.

With this strapping connection, a negative pulse on lead 155 will set the flip-flops, so that a positive potential will appear on the "0" output of flip-flop 142, and positive potentials will appear on the "1" outputs of flip-flops 143, 144, and 145. This gives a normal reading of 0111.

When a negative pulse appears on the electronic switch 12 over lead 149, flip-flop 142 shifts, so that positive appears on the "1" output and negative on the "0" output. This sends a negative pulse to the delay circuit 146 which delivers a delayed negative pulse to the center input of flip-flop 143 which shifts flip-flop 143 to its other condition, so that there is a positive potential on the "0" output and a negative potential on the "1" output.

When the next pulse is received from the electronic switch, the first flip-flop 142 will shift to positive potential on the "0" output, which will have no effect on the flip-flop 143.

The next pulse to be received from the electronic switch will shift the first flip-flop to "1" again, causing the second flip-flop 143 to shift to "1" after the delay of the delay circuit 146. This will in turn shift 144, etc. This binary count will continue throughout the 6 pulses from the electronic switch, and the 7th pulse will shift all the flip-flops to read 7 or 1110. In other words, on the 7th count, there wil be a negative potential on the "0" output of flip-flops 142, 143 and 144 and a negative potential on the "1" output of flip-flop 145.

These potentials from the "0" outputs of flip-flops 142 to 144 and the "1" output of flip-flop 145 are fed respectively to separate inputs 164, 165, 166 and 167 of reset gate 34 (indicated at 33 on FIG. 1), and are used to open the gate in a manner to be described.

In order to arrange the counter so that it may be adjusted to produce a proper input for the reset gate for other numbers than 7, groups 168, 169, 170 and 171 of terminals are provided respectively between the flip-flops 142 to 145 and their associated gate inputs 164 to 167. Each of these groups of terminals have three terminals, two of which are connected respectively to the outputs of the associated flip-flop and the other is connected to the associated input of the reset gate. When a different code is to be received, the strapping is changed accordingly.

The reset gate 34 comprises six diodes 172, 173, 174, 175, 176 and 177, each having its negative terminal connected to a wire 178 which is connected over a resistor 179 to a filtered source of twelve volts negative, indicated at 180. The diodes are all poled in a direction permitting current to flow through them from a positive source to the negative source 180 over the wire 178. The positive terminals of diodes 173 to 176 are connected respectively to the terminals 164 to 167 leading from the flip-flops 142 to 145, respectively. The diode 172 has its positive terminal connected over a wire 181 to the collector electrode of the transistor 50 in the input relay circuit 1. The diode 177 has its positive terminal connected over a lead 182 to the collector electrode of the first transistor 124 in the shift register 27.

The gate 34 controls the operation of the two-stage reset amplifier 37 which comprises two transistors 183 and 184. The base of the transistor 183 is connected over resistors 185 and 186 to the wire 178, thus forming the input to the reset amplifier. The base of the transistor 183 is given a suitable bias by means of a source of twelve volts positive, indicated at 187, and connected to the base over a resistor 188 and to the juncture of resistors 185 and 186 over a resistor 189. The juncture of resistors 185 and 186 is also coupled to ground over by-pass capacitor 190. The emitter of the transistor 183 is connected to ground.

The transistor 184 has its base connected over a resistor 191 to the collector electrode of the transistor 183. The resistor 191 forms part of a voltage divider network including a filtered source 192 of twelve volts negative, a resistor 193 connected between the source and the collector of the transistor, a source 194 of twelve volts positive which is connected to the resistor 191 over a resistor 195. The juncture of resistors 191 and 195 is connected to the base of transistor 184 to maintain proper bias thereon. A capacitor 196 is connected between the base and the collector of the transistor 194, and the collector is given a suitable bias by connecting it to the source 192 through a resistor 197. The emitter of the transistor 184 is also provided with a bias by connecting it over a resistor 198 to the positive source 194. It is prevented from rising above ground potential by means of a diode 199 connected between it and ground and poled so as to permit easy flow of current from the emitter to ground.

When a negative pulse appears on the input circuit from wire 178 of the gate 34, the base of transistor 183 becomes more negative with the result that more current flows through the collector-emitter circuit of that transistor. This raises the voltage on the collector of that transistor which causes the base of transistor 184 to increase in potential, so as to reduce the current in the emitter-collector circuit of this transistor. This causes the potential on the collector of transistor 184 to be lowered so as to produce a negative pulse which is delivered over a wire 200 to the reset time base generator 39.

This reset time base generator provides the pulse which resets the counter 15 to its normal condition. To this end the reset time base generator comprises a flip-flop circuit 201 which is similar to that used in the advance time base generator 17 and has two inputs S and R. The wire 200 from the reset amplifier is connected to the input S of this flip-flop circuit over a capacitor 202, a resistor 203, and an isolating diode 204. The flip-flop 201 has a "0" output 205 which is negative when the flip-flop is in its normal condition and a "1" output 206 which is normally positive. It also has an E output 207 which is normally negative.

The flip-flop circuit 201 is associated with a delay feedback circuit, similar to the feedback circuit of the advance time base generator 17, which will shift the flip-flop back to normal condition a predetermined time after it has been shifted out of its normal position. To this end a p-n-p transistor 208 has its base connected to the output 207, its emitter grounded, and its collector connected to one side of a capacitor 209 and to one end of a resistor 210. The other end of the resistor 210 is connected to a filtered source of negative voltage, indicated at 211, and the other side of the capacitor 209 is connected to ground.

With the flip-flop circuit 201 in its normal condition, there is a negative potential on the lead 207 which causes the transistor 208 to conduct which causes the capacitor 209 to be discharged, ground being connected to both sides of it. When the flip-flop 201 is shifted to its other condition, the lead 207 becomes positive, thus shutting off the transistor 208 which causes the capacitor 209 to start charging from the negative filtered source 211. The resistor 210 provides a delay in the charging of the capacitor, and when it reaches a predetermined level of charge, a negative potential is delivered over a resistor 212 to the base of a p-n-p transistor 213 which is normally not conducting. When the transistor 213 is thus turned on, current flows in the emitter-collector circuit through the primary of a transformer 214, the other end of which is connected to the negative source of potential, indicated at 215. The emitter is biased by means of a voltage divider circuit including the resistors 216 and 217 connected in series between a source of negative potential 218 and ground, the juncture of the two resistors being connected to the emitter electrode, this juncture being by-passed to ground over a capacitor 219.

A current pulse through the primary of the transformer 214 induces a voltage pulse in the secondary thereof, the secondary being connected across a resistor 220. One end of the resistor 220 is connected to ground and the other is connected over a wire 221 to the input R of the flip-flop circuit 201 over a resistor 222 and a decoupling diode 223. The transformer is wound in such a manner that a pulse induced in the secondary of the transformer by the operation of the transistor 213 will cause a negative pulse to appear on the wire 221. The amplitude of this negative pulse is limited by a diode 224 in series with a resistor 225 connected between the wire 221 and ground. The negative potential on the wire 221 applied to the input R of the flip-flop circuit 201 causes this circuit to shift back to its normal condition. It will be seen that this shift occurs a predetermined time after the flip-flop circuit has been shifted by the pulse from the amplifier circuit 37, such time being determined by the capacitor 209 and the resistor 210.

The positive pluse produced on the "0" output 205 of the flip-flop 201 when the flip-flop is shifted out of its normal condition is delivered over the wire 205 and through a diode 226 in the advance gate 19 to the juncture of the diode 116 and the diode 68 in the OR gate 8. This positive pulse blocks the diode 116 and prevents a pulse from being delivered over the wire 18 from the flip-flop 102 of the advance time base generator 17, so that the sample time base generator 10 is stopped. It will be recalled that up to this time this simple time base generator has been maintained in its operation by the pulses received from the advance time base generator over the lead 18.

The negative pulse which appears on the "1" output of the flip-flop circuit 201 of the reset time base generator 39 is delivered over the wire 206 through a capacitor 227 and a decoupling diode 228 and through a resistor 229 to the R input of the flip-flop circuit 89 in the electronic switch 12. This provides the negative pulse to shift this flip-flop circuit back to its normal condition in which a negative potential appears on the "0" output over lead 91 to cause the transistor 90 to conduct and short out any pulses coming into the electronic switch over the lead 88. Therefore, not only is the sample time base generator stopped, but the electronic switch is shut off to prevent pulses from passing through it. A resistor 230 is connected between ground and the juncture of capacitor 227 and diode 228 in order to complete the input circuit to the flip-flop 89.

The shift register 27 has its output 134 connected over a resistor 231 to the base of a transistor 232 which forms a buffer amplifier. The base is also biased by connecting it over a resistor 233 to a source of positive potential, indicated at 234. The emitter of the transistor 232 is connnected to ground, while the collector thereof is connected to a source of negative potential, indicated at 235, over a resistor 236 and a choke 237 in series therewith. The juncture of the resistor and choke is by-passed to ground over a capacitor 238. The output 239 of the transistor 232 is connected to the collector thereof.

The output 239 of the buffer amplifier 30 may be connected directly to the multipurpose relay 29 in a manner to be described or, alternately, through the inverter amplifier 31. The inverter amplifier comprises a p-n-p transistor 240 with its base connected over resistor 241 to the output 239 of the buffer amplifier. The emitter of the transistor 240 is grounded and the collector is connected to a filtered current source 241 of minus 12 volts.

In order to make the direct connection from the buffer amplifier 30 to the multipurpose relay 29 or, alternatively, to make the connection through the inverter amplifier 31, I provide three strapping terminals 242, 243 and 244. Terminal 242 is directly connected to the output 239 of the buffer amplifier, while terminal 243 is connected to the collector of the transistor 240 which forms the output of the inverter amplifier. The terminal 244 is the input to the multipurpose relay 29 and may be connected by suitable strapping either to the terminal 242 or the terminal 243.

The multipurpose relay 29 is provided so that the output of the complete regenerator circuit may be in any desired form, such as neutral or polar, and with any desired direction of current. The circuit comprises 4 transistors 245, 246, 247 and 248 with circuit connections and alternate strapping terminals for altering the circuitry.

The input terminal 244 is connected to the bases of both transistors 245 and 246, in the former case, through a diode 247 and a resistor 248 and, in the latter case, over a diode 249 and resistor 250. Both diodes are *poled for easy row of current toward the input terminal* 244. The base of the transistor 245, which is an n-p-n transistor, is proveded with a positive bias of 12 volts from a source 251 and the base is prevented from going more negative than ground by means of a clamping diode 252 connected between it and ground.

The transistor 246 is a p-n-p transistor and its base is also connected to a source 253 of plus 12 volts over a resistor 254. The base of this transistor is prevented from going more positive than ground by means of a diode 255 connected between it and ground.

The collector of the transistor 245 is connected to a terminal 1 of a group 256 of three strapping terminals, while the collector of the transistor 246 is connected to a terminal 1 of a group 257 of three strapping terminals.

Transistor 247 is a p-n-p transistor and has its base connected to terminal 1 of a group 258 of three strapping terminals. Transistor 248 is an n-p-n transistor and has its base connected to terminal 1 of three strapping terminals 259. The emitter of transistor 247 is connected to terminal 1 of three strapping terminals 260, while the emitter of transistor 248 is connected to terminal 1 of three strapping terminals 261. The collector of transistor 247 is connected to terminal 1 of three strapping terminals 262, while the collector of the transistor 248 is connected to terminal 1 of three strapping terminals 263.

A polar output terminal 264 is connected to terminal 3 of the terminals 262 over a resistor 265 and also over a resistor 266 to terminal 3 of the terminals 263. A neutral negative output terminal 267 is connected to terminal 2 of the strapping terminals 260, while a neutral positive output terminal 268 is connected to terminal 2 of strapping terminals 261.

Terminals 2 of strapping terminal groups 256, 259, and 263 are connected over a resistor 269 to a source of positive voltage, indicated at 270, while terminals 2 of strapping groups 257, 258, and 262 are connected to a source of negative potential, indicated at 271, over a resistor 272.

Terminal 3 of the group 256 is connected to terminal 3 of group 258 over a resistor 273. Also terminal 3 of group 258 is connected over a resistor 274 to terminal 3 of group 260 and, in addition, to a source of 60 volts positive, indicated at 275. Terminal 3 of group 260 is also provided with a clamping diode 276 to prevent the terminal from going below ground potential.

Terminal 3 of terminal group 257 is connected to terminal 3 of group 259 over a resistor 277. Terminal 3 of group 259 is also connected to terminal 3 of group 261 over a resistor 278 and to a source of 60 volts negative, indicated at 279. Terminal 3 of group 261 is also prevented from going more positive than ground by means of a clamping diode 280 connected between it and ground.

For producing a polar output, the terminals 1 and 3 of each terminal group are strapped together, as indicated by short curved lines, and the circuit will operate as follows: As long as input terminal 244 of the multipurpose relay 229 is positive, the base of transistor 245 will be positive, and since this transistor is of the n-p-n type, it will conduct. This causes the base of transistor 247 to become less positive or nearer ground potential, over the collector-emitter path of transistor 245, and, since transistor 247 is of the p-n-p type, it will conduct, thus causing terminals 264 to be supplied with a positive voltage output from the voltage source 275, over terminals 3 and 1 of terminal group 260, the emitter-collector path through transistor 247, over terminals 1 and 3 of terminal group 262, over resistor 265, to terminal 264.

During this period, the base of transistor 246 is also positive, and, since this transistor is a p-n-p transistor, it is shut off, thus making the base of transistor 248 negative from the negative source 279 over resistor 278 and terminals 3 and 1 of the terminal group 259. Since the transistor 248 is an n-p-n transistor, it will be shut off, thus opening the emitter-collector path of the transistor 248 to the terminal 264.

Now when the potential on the input terminal 244 swings negative as a negative pulse is applied thereto, transistor 245 will be shut off, thus shutting off transistor 247 and opening its emitter-collector path to the terminal 264. On the other hand, transistor 246 will be turned on, and this will cause the base of transistor 248 to become more positive because of ground over the emitter-collector path of transistor 246, whereby the transistor 248 will conduct and will provide a circuit from the minus 60 volt source 279, over terminals 3 and 1 of the terminal group 261, the emitter-collector path of the transistor 248, over terminals 1 and 3 of terminal group 263, through resistor 266, to terminal 264 where the negative potential will appear. Thus, shifting the input potential from positive to negative will cause output terminal 264 to shift from plus 60 volts to minus 60 volts which is the desired polar output.

The neutral output may be obtained by strapping terminals 1 and 2 of each of the terminal groups together instead of 1 and 3. When such strapping is provided, the circuit will operate as follows:

A positive potential on the input terminal 244 will cause the transistor 245 to conduct. This will apply ground to the base of transistor 248 over the emitter-collector path of transistor 245, terminals 1 and 2 of terminal group 256, and terminals 2 and 1 of terminal group 259. This will make the base of transistor 248 more negative, since with transistor 245 off, it would normally be connected over terminals 1 and 2 of terminal group 259, through resistor 269, to a positive voltage at source 270. Thus, transistor 248 will be shut off and the connection to the neutral positive output terminal 268, over terminals 2 and 1 of terminal group 261, will be opened at the collector-emitter path of transistor 248.

During this time, the transistor 246 is nonconductive, and this places a more negative potential on the base of transistor 247 from the negative source 271, over terminals 2 and 1 of terminal group 258, which will render transistor 247 conducting, whereby a negative potential will appear on the neutral negative output terminal 267 from the voltage source 271, over the resistor 272, terminals 2 and 1 of terminal group 262, the collector-emitter path of transistor 247, terminals 1 and 2 of terminal group 260, to terminal 267.

When the input 244 of the relay 29 becomes negative, transistor 245 will be shut off and transistor 246 will be turned on. With transistor 245 shut off, positive potential from source 270 will pass through terminals 2 and 1 of terminal group 259 to apply a positive potential to the base of transistor 248 which will turn this transistor on. With this transistor turned on, positive potential from source 270 will pass over terminals 2 and 1 of group 263, through the collector-emitter path of the transistor 248, over terminals 1 and 2 of terminal group 261, to the neutral positive output terminal 268, to provide a positive potential on this terminal.

At the same time, since the transistor 246 is conducting, ground, or more positive potential will appear on the base of transistor 247 from ground, over the emitter-collector path of transistor 246, terminals 1 and 2 of terminal group 257, and terminals 2 and 1 of terminal group 258. This will shut off transistor 247 and open its emitter-collector path over terminals 1 and 2 of group 260 to the neutral negative output terminal 267.

It will be seen from the above description that any form of mark and space signals may be fed into the regenerator at the input relay 1 and by suitable strapping in that relay to provide for the particular form of input, the circuit will function to produce a corresponding output from the shift register 27. Then by suitable strapping at the input of the multipurpose relay 29 and in the relay circuit itself, any form of output may be produced to correspond with the input pulses.

A feature of the invention resides in the fact that the circuit is adaptable to receiving different codes at different speeds. In FIGURE 8, the wave forms produced by the various elements of the circuit have a receiving speed of 50 bauds, using a 7 unit code comprising a start pulse, 5 information pulses, and a stop pulse. The units are all of equal spacing at 20 milliseconds. The particular character illustrated is one represented by space, mark, space, mark, and space. The start pulse is also a space and the stop pulse is a mark.

It will be seen that the start differentiating circuit 4 will produce a negative pulse at the initiation of each spacing signal. The synchronizing control gate 6, on the other hand, will produce a negative pulse only at the initiation of the start space pulse. The sampling time base generator 10 produces a succession of negative pulses beginning with each start signal, these negative pulses appearing a time after the start pulse is initiated corresponding to ½ the time of one unit pulse. The advance time base generator 17 produces a negative pulse which is delayed with respect to those of the sampling time base generator for ½ the time of one unit. The electronic switch 12 is turned on at the initiation of the start signal and the counter starts to count when the first pulse from the sampling time base generator passes through the electronic switch. The reset time base generator 39 operates after the counter has produced 7 output pulses and turns off the electronic switch and produces a stop pulse which prevents the sampling time base generator from operating. This release pulse ends after 15 milliseconds. The sampling gate 22 will produce a negative pulse at the initiation of each space signal and this will cause the first stage of the shift register 27 to produce a negative pulse. The second stage of the shift register, under control of the first stage and the pulse from the advance time base generator, will produce the output signal which corresponds to the input signal except that it is delayed by one unit and, in this case, is shown with opposite polartity.

FIG. 9 is a similar wave form diagram for a 7.42 unit code. This means that the stop signal which is a "mark" is 42% longer in time duration than the rest of the units. From an inspection of these diagrams, it will be seen that the various elements operate in exactly the same manner as when the units are all of equal time duration.

FIG. 10 is a similar wave form diagram showing a 50 baud code with 10.5 units. In this case, there are 8 information units with a start unit and a stop unit, the latter being 50% longer in time duration. It will be seen that the various elements will respond in the same manner without any change in circuitry.

In FIG. 11, a wave form diagram is shown which indicates what would happen if all "spaces" appeared in the input signal. The output of the register in this case would be a single long negative pulse corresponding to the number of "spaces" received. Many codes and speeds of transmission may be received with equal facility and requiring no change in circuitry.

From the above, it will be seen that the regenerator of the invention is remarkably flexible in that it will receive any speed of transmission from 45 bauds or less to 1,000 bauds or more, and by means of strapping any code within suitable limits may be received, and the regenerator can be made to receive neutral or polar signals with the current in either direction and to produce at the output any desired neutral or polar signal with the current in either direction.

While I have described the principles of my invention in connection with specific apparatus, it is to be clearly understood that the description is made only by way of example and not as a limitation to the scope of my invention as set forth in the specification thereof and in the accompanying claims.

What I desire to claim and secure by Letters Patent is:

1. A regenerator comprising
    (a) means for receiving sequences of signal pulses,
    (b) means responsive to the receipt by said receiving means of the first of said pulses for producing a train of sampling pulses,
    (c) means for utilizing said sampling pulses for sampling a predetermined portion of each pulse received by said receiving means,
    (d) regenerating means responsive to said sampling pulses for producing pulses of a predetermined duration corresponding to the signal pulses received by said receiving means,
    (e) means for counting the number of said sampling pulses,
    (f) means responsive to a predetermined count of said counting means for stopping the operation of said sampling-pulse-producing means, and
    (g) means for transmitting the output of said regenerating means.

2. A regenerator, as defined in claim 1, in which the means for producing the train of sampling pulses comprises
    (a) means for producing the first of said pulses at a predetermined time after the leading edge of the first pulse received by the receiving means, and
    (b) means for producing the remaining sampling pulses of the train at spaced intervals corresponding to the spacing of the received signal but independent of said signals.

3. A regenerator comprising
    (a) a translator for producing a succession of pulses in respect to the receipt of a succession of signals of a predetermined character,
    (b) means responsive to the first of said pulses for producing a train of short duration sampling pulses,
    (c) means for utilizing said sampling pulses for sampling a predetermined portion of each pulse produced by said translator,
    (d) regenerating means responsive to said sampling pulses for producing pulses of a predetermined duration corresponding to the pulses produced by said translator,
    (e) means for counting the number of said sampling pulses,
    (f) means responsive to a predetermined count of said counting means for stopping the operation of said sampling-pulse-producing means, and
    (g) means for transmitting the output of said regenerating means.

4. A regenerator, as defined in claim 3, in which the means for producing the train of sampling pulses comprises
    (a) means for producing the first of said pulses at a predetermined time after the leading edge of the first pulse produced by the translator, and
    (b) means for producing the remaining sampling pulses of the train at spaced intervals corresponding to the spacing of the signals received by said translator but independent of said signals.

5. A regenerator, as defined in claim 3, in which the means for producing sampling pulses comprises
    (a) a sampling time base generator adapted to respond to an applied pulse to produce a delayed sampling pulse,
    (b) an electronic gate connected to the translator and to the sampling time base generator and adapted to be opened by the first pulse delivered to it from the translator to pass sampling pulses from said sampling time base generator, and thereafter to remain open until closed,
    (c) an advance time base generator adapted to respond to an applied pulse to produce a control pulse at a predetermined time thereafter,
    (d) gating means connected to said electronic gate for preventing all translator pulses from reaching said sampling time base generator after said electronic gate has been opened,
    (e) means for causing said electronic gate to pass succeeding sampling pulses fed to it from said sampling time base generator,
    (f) means for feeding sampling pulses from said electronic gate to operate said advance time base generator, and
    (g) means for feeding pulses from said advance time base generator to operate said sampling time base generator.

6. A regenerator, as defined in claim 5, in which the means for stopping the operation of the sampling-pulse-producing means in response to a predetermined count by said counting means comprises
    (a) means connecting said counting means to said electronic gate for closing said electronic gate upon said predetermined count.

7. A regenerator comprising
    (a) means for receiving sequences of signal pulses,
    (b) means responsive to the receipt by said receiving means of the first of said pulses for producing a train of sampling pulses,
    (c) means for utilizing said sampling pulses for sampling a predetermined portion of each pulse received by said receiving means,
    (d) a shift register,
    (e) means for feeding pulses corresponding to signal pulses from said sampling means into said shift register,
    (f) means for utilizing said sampling pulses for shifting said shift register,
    (g) means for counting the number of said sampling pulses,
    (h) means responsive to a predetermined count of said counting means for stopping the operation of said sampling-pulse-producing means, and
    (i) means for transmitting the output of said shift register.

8. A regenerator, as defined in claim 7, in which the means for producing sampling pulses comprises
    (a) means for producing the first of said pulses at a predetermined time after the leading edge of the first signal pulse of a sequence, and
    (b) means for producing the remaining pulses of the train at spaced intervals corresponding to the spacing of the signal pulses but independent of the successive signal pulses of said sequence.

9. A regenerator, as defined in claim 7, in which the means for producing sampling pulses comprises (a) a sampling time base generator adapted to respond to an applied pulse to produce a delayed sampling pulse, (b) an electronic gate connected to the receiving means and to the sampling time base generator and adapted to be opened by the first pulse delivered to it from the receiving means to pass sampling pulses from said sampling time base generator, and thereafter to remain open until closed, (c) an advance time base generator adapted to respond to an applied pulse to produce a control pulse at a predetermined time thereafter, (d) gating means connected to said electronic gate for preventing all signal pulses from reaching said sampling time base generator after said electronic gate has been opened, (e) means for causing said electronic gate to pass succeeding sampling pulses fed to it from said sampling time base generator, (f) means for feeding sampling pulses from said electronic gate to operate said advance time base generator, and (g) means for feeding pulses from said advance time base generator to operate said sample time base generator.

10. A regenerator, as defined in claim 9, in which the means for stopping the operation of the sampling-pulse-producing means in response to a predetermined count by said counting means comprises (a) means connecting said counting means to said electronic gate for closing said electronic gate upon said predetermined count.

11. A regenerator, as defined in claim 9 in which the predetermined time after the leading edge of a first signal pulse that the sampling pulse is produced by the sample time base generator is equal to half the time duration of a signal pulse and the predetermined time after a pulse has been applied to the advance time base generator that said advance time base generator produces a pulse is also equal to half the time duration of a signal pulse, whereby said sampling pulses are spaced in time at the same spacing as said signal pulses but with one half pulse phase difference.

12. A regenerator, as defined in claim 10 in which the stopping means for closing said electronic gate comprises (a) an AND gate with a plurality of inputs from said counting means which are energized in the sense to open said AND gate at the predetermined count, (b) a first additional input from the signal receiving means adapted to be energized in the sense to open said AND gate only when a predetermined signal pulse is received, and (c) a second additional input from the first stage of the shift register adapted to be energized in the sense to open said AND gate only when said stage is in a condition to represent "no signal."

13. A regenerator, as defined in claim 12, in which the means for transmitting the output of the shift register comprises (a) a multi-purpose relay, and (b) means for adjusting said relay to produce any one of a plurality of different types of output signals.

14. A regenerator, as defined in claim 7, in which the means for stopping the operation of the sampling-pulse-producing means comprises (a) a counter, (b) an AND gate having a plurality of inputs from said counter and adapted to be energized in a sense to open said gate when said counter has countered a predetermined number, (c) a first additional input from the receiving means adapted to be energized in the sense to open said AND gate only when a predetermined signal pulse is received, and (d) a second additional input from the first stage of the shift register adapted to be energized in the sense to open said AND gate only when said stage is in a condition representing "no signal."

15. A regenerator, as defined in claim 7, in which the means for transmitting the output of the shift register comprises (a) a multi-purpose relay, and (b) means for adjusting said relay to produce any one of a plurality of different types of output signals.

16. A regenerator, as defined in claim 7, in which the receiving means comprises (a) a flip-flop circuit, and (b) means for causing said flip-flop circuit to assume one condition in response to a signal pulse of one characteristic and its other condition in response to a signal pulse of another characteristic regardless of the type of signals received.

17. A regenerator comprising (a) means for receiving a sequence of signal pulses, (b) means for producing a sequence of spaced sampling pulses when the operation thereof is initiated, said pulses having a predetermined spacing corresponding to the spacing of the pulses of the received sequence, (c) means responsive to the receipt of a first pulse by said receiving means to initiate the operation of said sampling-pulse-producing means, (d) an electric switch, (e) means responsive to the first pulse received by said receiving means to close said electronic switch, (f) counting means, (g) means for feeding the sampling pulses produced by said sampling-pulse-producing means to said counting means through said electronic switch when said switch is closed, (h) means responsive to a predetermined number of pulses counted by said counting means for opening said electronic switch and thereby stopping the pulses from said sampling-pulse-producing means to said counter, (i) a shift register, (j) means for feeding sampling pulses from said sampling-pulse-producing means to said shift register, but only when said pulses coincide with predetermined ones of the pulses received by said receiving means, and (k) an output circuit for transmitting the output of said shift register.

18. A regenerator, as defined in claim 17, in which the sampling-pulse-producing means comprises (a) means for producing the sampling pulses thereof at a predetermined time displacement from the pulses received by said receiving means.

References Cited by the Examiner
UNITED STATES PATENTS

| 2,752,425 | 6/56 | Dain | 178—70 |
| 2,816,956 | 12/57 | Wheeler et al. | 178—70 |
| 2,822,422 | 12/58 | Terry et al. | 178—70 |
| 3,008,006 | 11/61 | Van Berkel | 178—70 |
| 3,073,898 | 1/63 | Wilder et al. | 178—70 |

ROBERT H. ROSE, *Primary Examiner.*